United States Patent
Sekine

(10) Patent No.: US 10,816,776 B2
(45) Date of Patent: *Oct. 27, 2020

(54) IMAGING LENS

(71) Applicant: KANTATSU CO., LTD., Yaita-shi, Tochigi (JP)

(72) Inventor: Yukio Sekine, Sukagawa (JP)

(73) Assignee: KANTATSU CO., LTD., Yaita-shi, Tochigi (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/562,001

(22) Filed: Sep. 5, 2019

(65) Prior Publication Data

US 2019/0391371 A1  Dec. 26, 2019

Related U.S. Application Data

(63) Continuation of application No. 15/478,806, filed on Apr. 4, 2017, now Pat. No. 10,429,616.

(30) Foreign Application Priority Data

Apr. 4, 2016 (JP) ................... 2016-074947

(51) Int. Cl.
*G02B 13/18* (2006.01)
*G02B 3/02* (2006.01)
(Continued)

(52) U.S. Cl.
CPC .......... *G02B 13/0045* (2013.01); *G02B 9/60* (2013.01); *G02B 27/0025* (2013.01)

(58) Field of Classification Search
CPC ...... G02B 13/18; G02B 9/60; G02B 13/0045; G02B 13/06; G02B 13/16; G02B 15/14
See application file for complete search history.

(56) References Cited

U.S. PATENT DOCUMENTS 10,386,600 B2   8/2019  Kubota et al.
2013/0050847 A1* 2/2013  Hsu ................ G02B 13/0045
                                              359/714
(Continued)

FOREIGN PATENT DOCUMENTS

CN      202486401 U    10/2012
CN      103135204 A    6/2013
(Continued)

OTHER PUBLICATIONS

Office Action, U.S. Appl. No. 16/561,967, dated Oct. 2, 2019 (19 pages).

*Primary Examiner* — Alicia M Harrington
(74) *Attorney, Agent, or Firm* — Hamre, Schumann, Mueller & Larson, P.C.

(57) ABSTRACT

A compact imaging lens with high-resolution, low profile, low F-value, and wide field of view, properly corrects various aberrations and comprises a first lens having positive refractive power and a convex surface facing the object side, a second lens having a meniscus shape with negative refractive power and a concave surface facing the image side, a third lens having positive refractive power and a convex surface facing the object side, a fourth lens having a meniscus shape with positive refractive power and a convex surface facing the image side, and a fifth lens having negative refractive power and a concave surface facing the image side as a double-sided aspheric lens. A pole point at an off-axial point is provided on the image-side surface, and $40<|r6/f|<90$ where f: the focal length of the overall optical system and r6: curvature radius of the image-side surface of the third lens.

6 Claims, 14 Drawing Sheets

(51) Int. Cl.
G02B 13/00 (2006.01)
G02B 9/60 (2006.01)
G02B 27/00 (2006.01)

(56) References Cited

U.S. PATENT DOCUMENTS

| | | |
|---|---|---|
| 2013/0286488 A1 | 10/2013 | Chae |
| 2014/0015991 A1 | 1/2014 | Yamada et al. |
| 2014/0233111 A1 | 8/2014 | Teraoka |
| 2016/0231535 A1* | 8/2016 | Tang .................. G02B 13/0045 |
| 2016/0377831 A1 | 12/2016 | Liu et al. |

FOREIGN PATENT DOCUMENTS

| | | |
|---|---|---|
| CN | 203480113 U | 3/2014 |
| CN | 203480114 U | 3/2014 |
| CN | 203480118 U | 3/2014 |
| CN | 204166189 U | 2/2015 |
| JP | 2011-141396 A | 7/2011 |
| JP | 2012-103717 A | 5/2012 |
| TW | 201317618 A | 5/2013 |
| WO | 2013099255 A1 | 7/2013 |
| WO | 2013187405 A1 | 12/2013 |
| WO | 2012/132247 A1 | 7/2014 |
| WO | 2014103197 A1 | 7/2014 |
| WO | 2015041123 A1 | 3/2015 |

* cited by examiner ined IMAGING LENS

The present application is based on and claims priority of Japanese patent application No. 2016-074947 filed on Apr. 4, 2016, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact imaging device, and more particularly to an imaging lens which is built in an imaging device mounted in an increasingly compact and low-profile mobile phone and smartphone, a portable terminal device such as PDA (Personal Digital Assistant), an information terminal such as a game console and a PC, and a home appliance.

Description of the Related Art

In recent years, performance of the information terminals has been greatly improved and it becomes common that a camera is mounted in many information terminals including the smartphone. Furthermore, products have been made one after another, such as home appliances with the camera, which have begun to be widespread, and consumer's convenience is greatly improved. Demand of products such as the information terminals and the home appliances with the camera is more increased, and development of products is rapidly made accordingly.

In a conventional art, as an imaging lens intended to be relative compact and to secure high performance, for example, following Patent Documents 1 and 2 disclose such imaging lens.

Patent Document 1 (JP-A-2011-141396) discloses an imaging lens comprising in order from an object side, a first lens having positive refractive power, a second lens having negative refractive power, a biconvex third lens, a fourth lens having a meniscus shape with a convex surface facing an image side, and a fifth lens having negative refractive power which is gradually weakened from a center to a peripheral area and positive refractive power at the peripheral area.

Patent Document 2 (JP-A-2012-103717) discloses a single focus optical system comprising in order from the object side, a first group of a first lens having positive refractive power and a convex surface facing the object side and a second lens having negative refractive power and a concave surface facing the image side and Including an aspheric surface, a second group of a third lens having the aspheric surface, and a third group of a fourth lens having positive refractive power and a convex surface facing the image side and a fifth lens having negative refractive power and a concave surface facing the Image side and including an aspheric surface having a pole point.

In the imaging lens disclosed in the above Patent Document 1, field of view is about 60 degrees, and recent requirement for the wide field of view is not sufficiently satisfied. There is a problem of aberration correction in the peripheral area therefor.

In the imaging lens disclosed in the above Patent Document 2, F-value is about F2.8, and it is not a bright lens system sufficiently appropriate for the image sensor which is compact and has high pixels. When the bright lens system is obtained while maintaining low-profileness and the wide field of view, there is a problem of aberration correction in the peripheral area therefor.

SUMMARY OF THE INVENTION

The present invention has been made in view of the above problems, and an object of the present invention is to provide a compact imaging lens with high resolution which realizes low-profileness, low F-value and a wide field of view in well balance, and properly corrects aberrations.

Here, low-profile implies that total track length is smaller than 5 mm, and ratio of total track length to diagonal length is smaller than 0.9, and low F-value implies brightness having F2.4 or less. A wide field of view implies that the field of view is 70 degrees or more which is a range capable of photographing. The diagonal length of the effective Imaging plane of the image sensor for showing the ratio of total track length to diagonal length is taken as equal to the diameter of an effective imaging circle whose radius is the vertical height from an optical axis to the point where a light ray incident on the imaging lens at a maximum field of view forms the image on the image plane, namely twice length of maximum image height.

Regarding terms used in the present invention, a convex surface or a concave surface implies that the paraxial portion (portion near the optical axis) of the surface is convex or concave. The pole point implies that an off-axial point on an aspheric surface at which a tangential plane intersects the optical axis perpendicularly. The total track length is defined as a distance along the optical axis from an object-side surface of an optical element nearest to the object side to the imaging plane, when thickness of the optical element such as an IR cut filter or a cover glass located between the last lens and the imaging plane of the image sensor is regarded as an air.

In order to achieve the above object, an imaging lens according to the present invention is to form an image of an object on a solid-state image sensor and comprises in order from an object side to an image side, a first lens having positive refractive power and a convex surface facing the object side, a second lens having a meniscus shape with negative refractive power and a concave surface facing the image side, a third lens having positive refractive power and a convex surface facing the object side, a fourth lens having a meniscus shape with positive refractive power and a convex surface facing the image side and a fifth lens having negative refractive power and a concave surface facing the image side as a double-sided aspheric lens. A pole point at an off-axial point is provided on the image-side surface of the fifth lens, a below conditional expression (1) is satisfied:

$$40 < |r6/f| < 90 \qquad (1)$$

where f: the focal length of the overall optical system of the Imaging lens, and r6: curvature radius of the image-side surface of the third lens.

The imaging lens of the above structure has a constitution similar to the so-called telephoto type, and, in order from the object side, has refractive powers, positive, negative, positive, positive and negative. An appropriate refractive power is assigned to each lens and the low-profileness can be provided.

According to the above structure, the first lens has positive refractive power and a convex surface facing the object side. Having large refractive power enables the low-profileness and the wide field of view to the imaging lens. A shape of the first lens only has the convex surface facing the object side, and may have a meniscus shape with the convex surface facing the object side or a biconvex shape near the optical axis.

The second lens has negative refractive power and the concave surface facing the Image side, and properly corrects spherical aberration and chromatic aberration occurred on the first lens. A shape of the second lens only has the concave surface facing the image side, and may have a meniscus shape with the concave surface facing the image side or a biconcave shape.

The third lens has the smallest positive refractive power among the constituent lenses. The third lens has the positive refractive power, and properly corrects spherical aberration and coma aberration which the first lens and the second lens do not sufficiently correct, while maintaining the low-profileness. A shape of the third lens only has the convex surface facing the object side, may have a meniscus shape with the convex surface facing the object side, or a biconvex shape.

The fourth lens has large positive refractive power and convex surface facing the image side. The positive refractive power of the fourth lens is appropriately balanced with the first lens, and the low-profileness and the wide field of view of the imaging lens are provided, thereby astigmatism and field curvature are properly corrected.

The fifth lens has negative refractive power and the concave surface facing the image side, and appropriate back focus is secured. The fifth lens is made as a double-sided aspheric lens and a pole point is provided at an off-axial point on the image-side surface. Thereby, there are effectively carried out correction of astigmatism, distortion and field curvature, and control of Chief Ray Angle to the image sensor.

Conditional expression (1) defines an appropriate range of curvature radius of the image-side surface of the third lens to the focal length of the overall optical system of the imaging lens. The conditional expression (1) is a condition for suppressing increase in eccentric sensitivity of the third lens and for properly correcting the spherical aberration and the coma aberration. If the low-profileness of the imaging lens is provided, refractive power of each lens tends to be large, and in addition to the first lens and the second lens near an aperture diameter, the eccentric sensitivity of the third lens may be increased and productivity becomes deteriorated. By defining the range of the conditional expression (1), the refractive power of the image-side surface of the third lens can be appropriately controlled to be relative small, the increase in the eccentric sensitivity of the third lens is suppressed and the spherical aberration and the coma aberration can be properly corrected.

According to the imaging lens of the present invention, it is preferable that a below conditional expression (2) is satisfied:

$$0.5<(T1/f)*100<3.1 \tag{2}$$

where f: the focal length of the overall optical system of the imaging lens, and T1: distance along the optical axis from the Image-side surface of the first lens to the object-side surface of the second lens.

The conditional expression (2) defines an appropriate range of the distance along the optical axis from the image-side surface of the first lens to the object-side surface of the second lens to the focal length of the overall optical system of the imaging lens. The conditional expression (2) Is a condition for proper correction of the distortion and the field curvature, and for excellent assembly property of the imaging lens, while providing the low-profileness of the imaging lens. If the value of below the upper limit of the conditional expression (2), an air interval on the optical axis between the first lens and the second lens does not become too large, and there are suppressed difficulty in the low-profileness and increase in the distortion and the field curvature. If the value is above the lower limit of the conditional expression (2), the air interval on the optical axis between the first lens and the second lens does not become too small, and risk of contacting the first lens and the second lens in assembly work can be suppressed.

According to the imaging lens of the present invention, it is preferable that a below conditional expression (3) is satisfied:

$$0.3<f1/|f2|<0.6 \tag{3}$$

where f1: focal length of the first lens, and f2: focal length of the second lens.

The conditional expression (3) defines an appropriate range of relationship of the focal length of the first lens and the focal length of the second lens, and is a condition for providing both of the low-profileness of the imaging lens and proper correction of the chromatic aberration. If the value of below the upper limit of the conditional expression (3), it is suppressed that the negative refractive power of the second lens becomes relatively small to the positive refractive power of the first lens, and it is advantageous to the low-profileness. If the value is above the lower limit of the conditional expression (3), it is suppressed that the negative refractive power of the second lens becomes relatively large to the positive refractive power of the first lens, and the low-profileness, and correction of axial chromatic aberration and chromatic aberration of magnification are facilitated.

According to the imaging lens of the present invention, it is preferable that a below conditional expression (4) is satisfied:

$$-27<f45/f<-3 \tag{4}$$

where f: the focal length of the overall optical system of the imaging lens, and f45: the composite focal length of the fourth lens and the fifth lens.

The conditional expression (4) defines an appropriate range of relationship of the composite focal length of the fourth lens and the fifth lens and the focal length of the overall optical system of the imaging lens. The conditional expression (4) is a condition for securing back focus and suppressing an angle of light ray incident to the image sensor, while providing the low-profileness.

If the value of below the upper limit of the conditional expression (4), it can be suppressed that the total track length become large. If the value is above the lower limit of the conditional expression (4), the back focus is prevented from being small, and there is suppressed difficulty in sufficiently securing a space for arranging the IR cut filter or the like and in controlling the angle of light ray incident to the image sensor.

According to the imaging lens of the present invention, it is preferable that a below conditional expression (5) is satisfied:

$$0.6<D4/D5<1.6 \tag{5}$$

where

D4: thickness on the optical axis of the fourth lens, and

D5: thickness on the optical axis of the fifth lens.

The conditional expression (5) defines an appropriate range of the thickness on the optical axis of the fourth lens and the fifth lens, and a condition for securing formability of the fourth lens and the fifth lens while providing the low-profileness of the imaging lens. If the value of below the upper limit of the conditional expression (5), it can be suppressed that a center thickness of the fifth lens is too small, and the excellent formability can be secured. The convex surface facing the image side of the fourth lens has the large positive refractive power, and curvature becomes relatively large in comparison with the curvature of the object-side surface. Thereby, the convex surface facing the image side of the fourth lens becomes an aspherical surface which an edge thickness becomes small. If the value is above the lower limit of the conditional expression (5), the edge thickness does not become too small, and the excellent formability can be secured.

Herein, the center thickness implies a thickness in an optical axis direction at a center of the lens, namely, a distance between the object-side surface and the image-side surface, and in the present invention, the center of the lens corresponds to the optical axis. The edge thickness is a thickness in the optical axis direction at a peripheral of the lens.

According to the imaging lens of the present invention, it is preferable that a below conditional expression (6) is satisfied:

$$-6.9 < r9/r10 < -1.2 \qquad (6)$$

where r9: curvature radius of the object-side surface of the fifth lens, and r10: curvature radius of the image-side surface of the fifth lens.

The conditional expression (6) defines an appropriate range of relationship of the curvature radius of the object-side surface of the fifth lens and the curvature radius of the image-side surface of the fifth lens, and is a condition for properly correcting the distortion and facilitating manufacturability. If the value of below the upper limit of the conditional expression (6), it is suppressed that the distortion becomes deteriorated, and a ratio of uneven thickness which is a ratio of the thinnest part and the thickest part becomes large and the formability becomes deteriorated. If the value is above the lower limit of the conditional expression (6), deterioration of the distortion is suppressed, it is also suppressed that the edge interval between the fourth lens and the fifth lens becomes too large, and a spacer for establishing a mechanism will become unnecessary.

According to the imaging lens of the present invention, it is preferable that a below conditional expression (7) is satisfied:

$$TLA/2ih < 0.9 \qquad (7)$$

where

TLA: total track length in air, and ih: maximum image height.

The conditional expression (7) defines a ratio of total track length to diagonal length. If the value of below the upper limit of the conditional expression (7), the total track length does not become too large, and demand of the low-profileness of the imaging lens is effectively met.

According to the imaging lens of the present invention, it is preferable that a below conditional expression (8) is satisfied:

$$0.7 < ih/f < 1.0 \qquad (8)$$

where f: the focal length of the overall optical system of the imaging lens, and ih: maximum image height.

The conditional expression (8) defines a range of photographic field of view. If the value of below the upper limit of the conditional expression (8), the field of view does not become too large, a deviation from a range capable of properly correcting aberrations is not made, difficulty in correction of aberrations particularly in peripheral area of the image plane is prevented, and deterioration in optical performance is suppressed. If the value is above the lower limit of the conditional expression (8), the wide field of view can be effectively provided, the focal length of the overall optical system of the imaging lens does not become too large and it is advantageous to the low-profileness.

According to the Imaging lens of the present invention, the third lens preferably has the convex surface facing the image side.

When the image-side surface of the third lens is formed as a convex surface, an emitting angle of the light ray emitted from the surface can be small. Thereby, the spherical aberration and the coma aberration which increase in accordance with shortening of the total track length can be properly corrected.

According to the Imaging lens of the present invention, it is preferable that a below conditional expression (9) is satisfied:

$$6 < r6/r7 \qquad (9)$$

where r6: curvature radius of the image-side surface of the third lens, and r7: curvature radius of the object-side surface of the fourth lens.

The conditional expression (9) defines appropriate range of relationship of the curvature radius of the image-side surface of the third lens and the curvature radius of the object-side surface of the fourth lens. By defining the range of the conditional expression (9), increase in eccentric sensitivity of the third lens is suppressed and correction of the field curvature of the fourth lens are facilitated while providing the low-profileness of the imaging lens.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11 and 13 are schematic views showing the general configurations of the imaging lenses in Examples 1 to 7 according to the embodiments of the present invention, respectively. Since all these examples have the same basic lens configuration, the general configuration of an imaging lens according to this embodiment is explained below mainly referring to the schematic view of Example 1.

Figure 1:
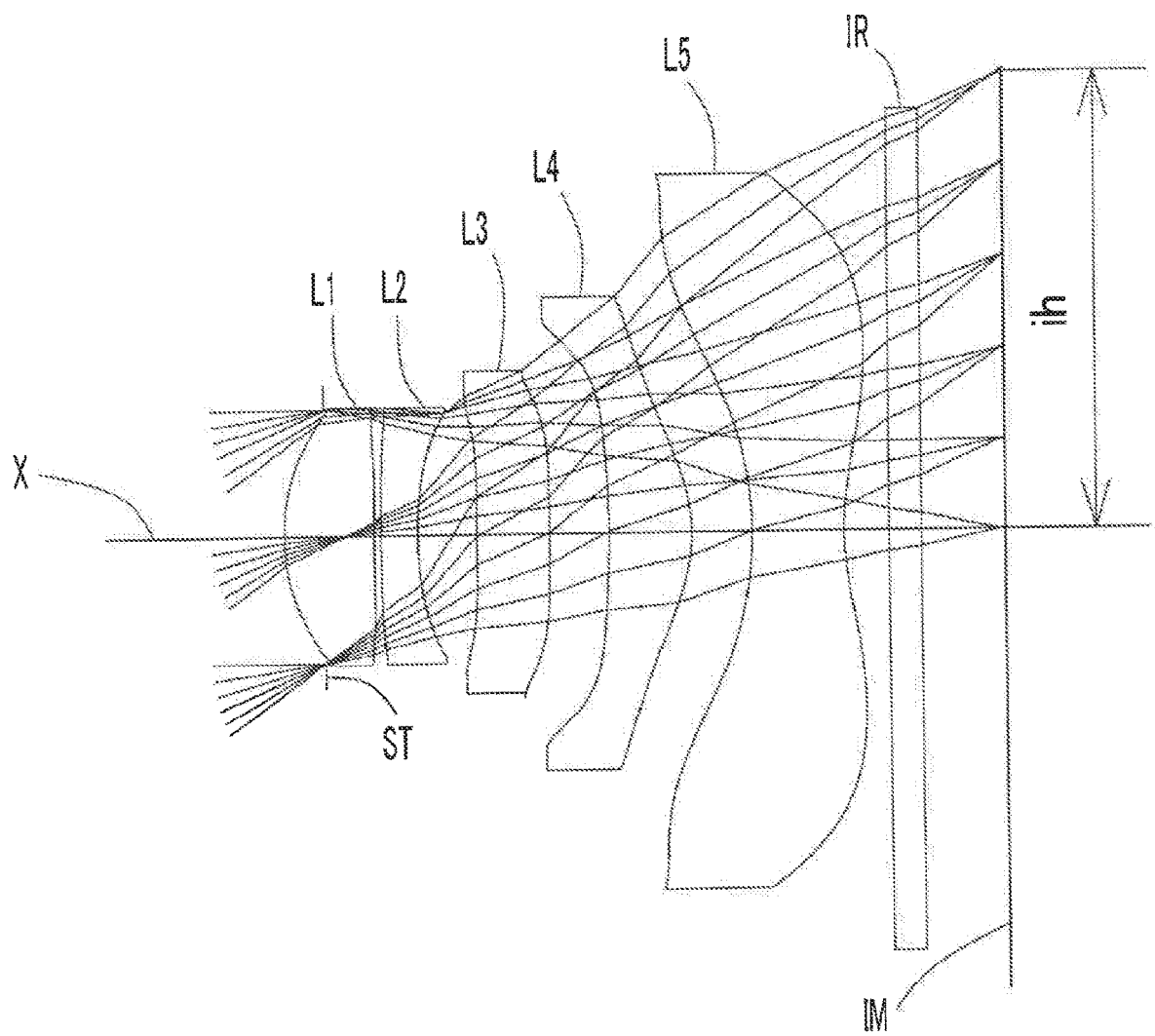
FIG. 1 is a schematic view showing a general configuration of an imaging lens in Example 1 according to the present invention.

As shown in FIG. 1, the imaging lens according to this embodiment comprises in order from an object side to an image side, an aperture stop ST, a first lens L1 having positive refractive power, a second lens L2 having negative refractive power, a third lens L3 having positive refractive power, a fourth lens L4 having positive refractive power, and a fifth lens L5 having negative refractive power. A filter IR such as an IR cut filter and a cover glass is located between the fifth lens L5 and an image plane IM, namely the image plane of the imaging sensor. The filter IR is omissible.

The imaging lens comprising the above five constituent lenses has a constitution similar to the so-called telephoto type, and, in order from the object side, has refractive powers, positive, negative, positive, positive and negative. An appropriate refractive power is allocated to each lens and the low-profileness can be provided.

In the imaging lens comprising the above five constituent lenses, the first lens L1 is a meniscus lens having the positive refractive power and the convex surface facing the object side. The image-side surface of the first lens L1 may have a concave surface having curvature radius larger than the curvature radius of the object-side surface within a range which the refractive power is not too lowered and an amount of spherical aberration is not increased, and thereby low-profileness and wide field of view of the imaging lens are provided. The first lens L1 may be biconvex. In such case, the positive refractive power is appropriately allocated to the object-side surface and the image-side surface, and large positive refractive power is provided while suppressing occurrence of the spherical aberration, and further low-profileness and wide field of view of the imaging lens can be provided.

The second lens L2 is a meniscus lens having the negative refractive power and the concave surface facing the image side, and properly corrects the spherical aberration and the chromatic aberration occurred on the first lens L1.

The third lens L3 is a meniscus lens having the positive refractive power and the convex surface facing the object side. The third lens has the smallest positive refractive power among the constituent lenses of the imaging lens. The third lens has the positive refractive power, and properly corrects the spherical aberration and the coma aberration which the first lens L1 and the second lens L2 can not sufficiently correct, while maintaining the low-profileness. A shape of the third lens is not limited to the shape of the present embodiment 1. For example, as shown in Examples 2 to 7 in FIGS. 3, 5, 7, 9, 11 and 13, the third lens L3 has a biconvex shape having the convex surface facing the image side.

The fourth lens L4 is a meniscus lens having large positive refractive power and convex surface facing the image side. The positive refractive power of the fourth lens L4 is appropriately balanced with the first lens L1, and the low-profileness and the wide field of view of the imaging lens are provided, thereby the astigmatism and the field curvature are properly corrected.

The fifth lens L5 has the negative refractive power and the concave surfaces facing the object side and the image side, and appropriate back focus are secured. The fifth lens L5 is made as a double-sided aspheric lens and the image-side surface is aspheric lens which a pole point is provided at an off-axial point. Thereby, proper correction of the astigmatism, the distortion and the field curvature is made, and Chief Ray Angle to the image sensor is controlled in an appropriate range.

The aperture stop ST is located between a vertex of the object-side surface of the first lens L1 and the peripheral area of the surface, and an entrance pupil position goes away from the image surface IM, and securing telecentricity becomes easy.

The imaging lens according to the present embodiments facilitates manufacture by using plastic materials to all of the lenses, and makes mass production in a low price possible. Both surfaces of all of the lenses are aspheric surfaces, and the aberrations are properly corrected.

The imaging lens according to the present embodiments satisfies below conditional expressions (1) to (9), and preferable effect is provided:

$$40<|r6/f|<90 \qquad (1)$$

$$0.5<(T1/f)*100<3.1 \qquad (2)$$

$$0.3<|f1/f2|<0.6 \qquad (3)$$

$$-27<f45/f<-3 \qquad (4)$$

$$0.6<D4/D5<1.6 \qquad (5)$$

$$-6.9<r9/r10<-1.2 \qquad (6)$$

$$TLA/2ih<0.9 \qquad (7)$$

$$0.7<ih/f<1.0 \qquad (8)$$

$$6<r6/r7 \qquad (9)$$

where
f: the focal length of the overall optical system of the imaging lens,
f1: focal length of the first lens L1, and
f2: focal length of the second lens L2.
f45: the composite focal length of the fourth lens L4 and the fifth lens L5.
r6: curvature radius of the image-side surface of the third lens L3.
r7: curvature radius of the object-side surface of the fourth lens L4.
r9: curvature radius of the object-side surface of the fifth lens L5, and
r10: curvature radius of the image-side surface of the fifth lens L5.
D4: thickness on the optical axis X of the fourth lens L4, and
D5: thickness on the optical axis X of the fifth lens L5.
T1: distance along the optical axis X from the image-side surface of the first lens L1 to the object-side surface of the second lens L2.
TLA: total track length in air, and
ih: maximum image height.

The imaging lens according to the present embodiments satisfies below conditional expressions (1a) to (9a), and preferable effect is provided:

$$45 < |r6/f| < 70 \tag{1a}$$

$$0.54 < (T1/f)*100 < 2.8 \tag{2a}$$

$$0.35 < f1/|f2| < 0.55 \tag{3a}$$

$$-20 < f45/f < -3.3 \tag{4a}$$

$$0.7 < D4/D5 < 1.45 \tag{5a}$$

$$-6.3 < r9/r10 < -1.3 \tag{6a}$$

$$TLA/2ih < 0.8 \tag{7a}$$

$$0.75 < ih/f < 0.93 \tag{8a}$$

$$6.8 < r6/r7 < 60 \tag{9a}$$

where signs of each conditional expression are same as that in the last paragraph.

Furthermore, the imaging lens according to the present embodiments satisfies below conditional expressions (1b) to (9b), and particularly preferable effect is provided:

$$49.30 \leq |r6/f| \leq 52.24 \tag{1b}$$

$$0.58 \leq (T1/f)*100 \leq 2.56 \tag{2b}$$

$$0.39 \leq f1/|f2| \leq 0.51 \tag{3b}$$

$$-14.42 \leq f45/f \leq -3.56 \tag{4b}$$

$$0.78 \leq D4/D5 \leq 1.32 \tag{5b}$$

$$-5.74 \leq r9/r10 \leq -1.44 \tag{6b}$$

$$TLA/2ih < 0.70 \tag{7b}$$

$$0.82 \leq ih/f \leq 0.85 \tag{8b}$$

$$7.56 \leq r6/r7 \leq 55.55 \tag{9b}$$

where signs of each conditional expression are same as that in one paragraph before the last paragraph.

In the imaging lens according to the present embodiments, it is preferable to satisfy all of conditional expressions. By satisfying the conditional expression individually, operational advantage corresponding to each conditional expression can be obtained.

In this embodiment, the aspheric shapes of the surfaces of the aspheric lens are expressed by Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1+\sqrt{1-(k+1)\frac{H^2}{R^2}}} + A_4H^4 + A_6H^6 + A_8H^8 + A_{10}H^{10} + A_{12}H^{12} + A_{14}H^{14} + A_{16}H^{16} \quad \text{Equation 1}$$

Next, examples of the imaging lens according to this embodiment will be explained. In each example, f denotes the focal length of the overall optical system of the imaging lens, Fno denotes an F-number, ω denotes a half field of view, and ih denotes a maximum image height.

Additionally, i denotes surface number counted from the object side, r denotes a curvature radius, d denotes the distance of lenses along the optical axis (surface distance), Nd denotes a refractive Index at d-ray (reference wavelength), and vd denotes an abbe number at d-ray. As for aspheric surfaces, an asterisk (*) is added after surface number i.

Example 1

The basic lens data is shown below in Table 1.

TABLE 1

Numerical Data Example1
Unit mm
f = 4.00 ih = 3.26 Fno = 2.19 TLA = 4.58 ω(°) = 38.8

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.25900 | | |
| 2* | 1.51762 | 0.58514 | 1.544 | 55.57 |
| 3* | 24.68794 | 0.04131 | | |
| 4* | 10.85217 | 0.24137 | 1.650 | 21.54 |
| 5* | 2.79127 | 0.38567 | | |
| 6* | 60.63899 | 0.46745 | 1.535 | 56.16 |

TABLE 1-continued

Numerical Data Example1
Unit mm
f = 4.00 ih = 3.26 Fno = 2.19 TLA = 4.58 ω(°) = 38.8

| | | | | |
|---|---|---|---|---|
| 7* | 197.16140 | 0.38290 | | |
| 8* | −6.69444 | 0.52088 | 1.535 | 56.16 |
| 9* | −1.27267 | 0.38625 | | |
| 10* | −3.11964 | 0.59446 | 1.535 | 56.16 |
| 11* | 1.92354 | 0.50000 | | |
| 12 | Infinity | 0.21000 | 1.517 | 64.20 |
| 13 | Infinity | 0.33339 | | |
| Image Plane | Infinity | | | |

Constituent Lens Data

| Lens | Start Surface | Focal Length |
|---|---|---|
| 1 | 2 | 2.95 |
| 2 | 4 | −5.85 |
| 3 | 6 | 163.61 |
| 4 | 8 | 2.84 |
| 5 | 10 | −2.14 |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | −2.149730E+00 | 0.000000E+00 | 0.000000E+00 |
| A4 | 7.506331E−03 | −1.394127E−01 | −1.625579E−01 | −2.462439E−02 | −1.129055E−01 | −7.915829E−02 |
| A6 | −4.512954E−02 | 4.693254E−01 | 6.236078E−01 | 2.627730E−01 | −1.091413E−01 | −1.165505E−01 |
| A8 | 1.006751E−01 | −6.703280E−01 | −8.557027E−01 | −2.428849E−01 | 3.006164E−01 | 1.421465E−01 |
| A10 | −8.764735E−02 | 2.820225E−01 | 3.765263E−01 | 6.983993E−02 | −3.330509E−01 | −1.154202E−01 |
| A12 | 0.000000E+00 | 0.000000E+00 | 2.557405E−02 | 7.024283E−02 | 1.715749E−01 | 4.978464E−02 |
| A14 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | 0.000000E+00 | −5.000000E+00 | 0.000000E+00 | −1.178417E+01 |
| A4 | 1.670236E−02 | −7.644651E−02 | −4.294930E−02 | −6.811694E−02 |
| A6 | 9.838990E−02 | 1.803216E−01 | 2.119091E−02 | 2.594775E−02 |
| A8 | −2.770284E−01 | −1.332146E−01 | −1.783729E−05 | −7.494030E−03 |
| A10 | 2.824681E−01 | 4.865946E−02 | −1.022848E−03 | 1.262376E−03 |
| A12 | −1.673378E−01 | −9.370523E−03 | 1.745288E−04 | −1.222612E−04 |
| A14 | 5.173233E−02 | 9.278256E−04 | −8.576592E−06 | 5.279832E−06 |
| A16 | −6.121296E−03 | −4.546733E−05 | −1.050195E−07 | 0.000000E+00 |

The imaging lens in Example 1 is a concave surface facing the image-side surface of the third lens L3, and satisfies conditional expressions (1) to (8) as shown in Table 8.

Figure 2:
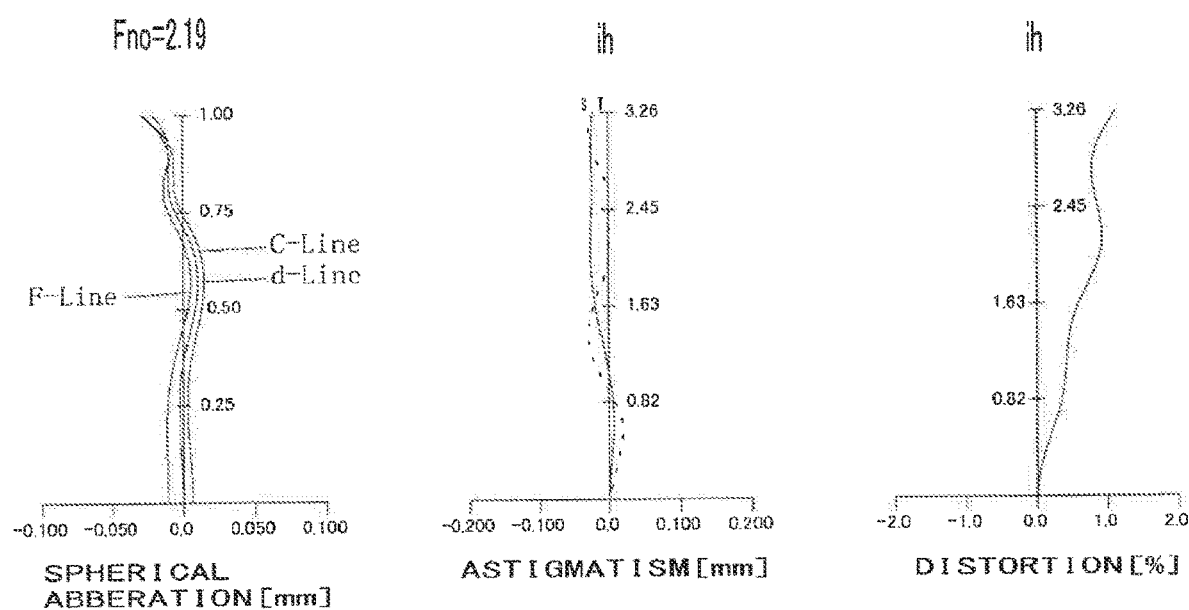
FIG. 2 shows spherical aberration, astigmatism, and distortion of the imaging lens in Example 1 according to the present invention.
Figure 3:
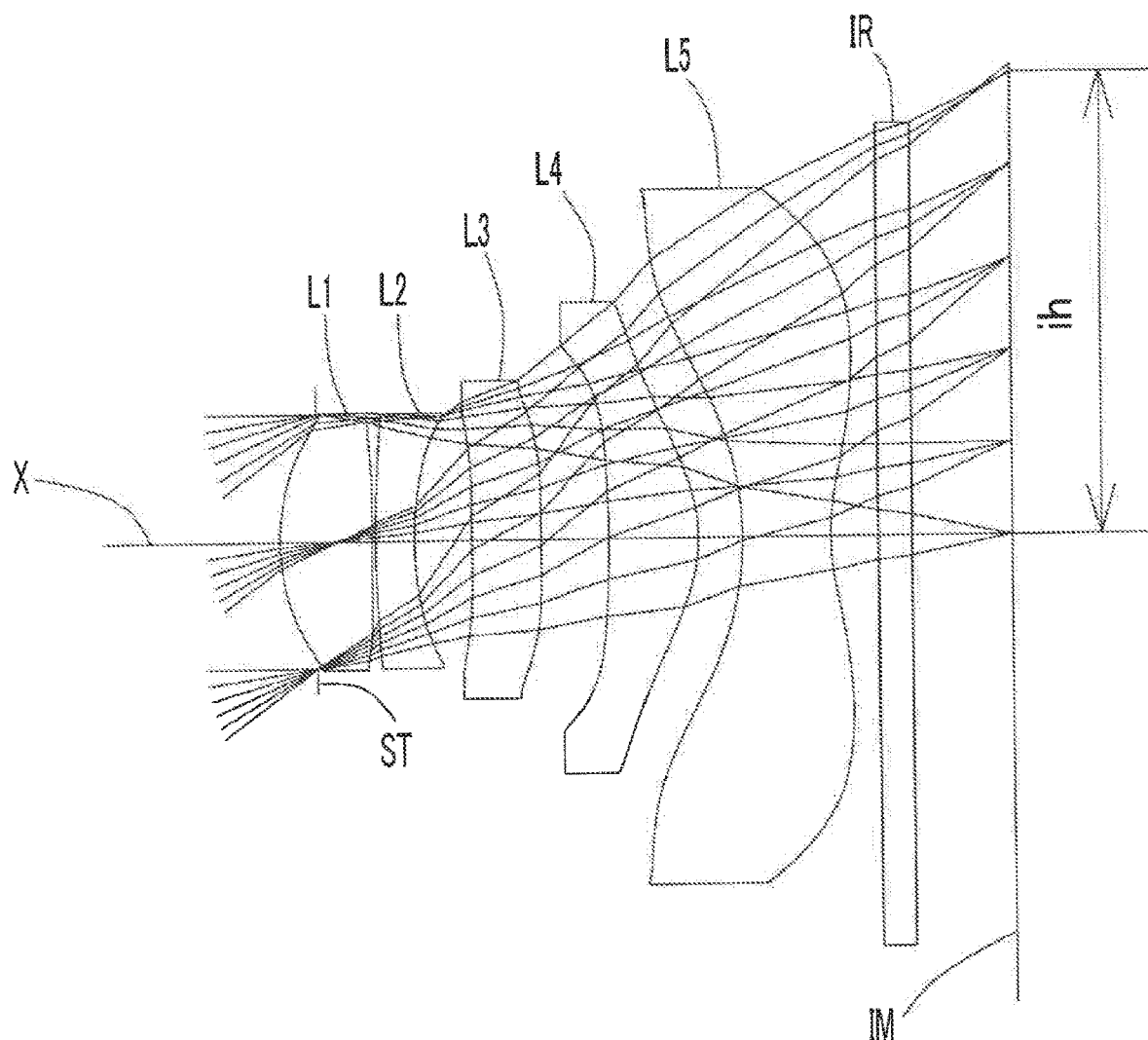
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S and on tangential Image surface T (same as FIG. 4, FIG. 6, FIG. 8, FIG. 10, FIG. 12 and FIG. 14). As shown in FIG. 2, each aberration is corrected properly.

Total track length in air TLA is 4.58 mm, ratio of total track length to diagonal length is 0.70 as low-profile, and the imaging lens has brightness of F2.19 and wide field of view of about 78 degrees.

Example 2

The basic lens data is shown below in Table 2.

TABLE 2

Numerical Data Example2
Unit mm
f = 3.98 ih = 3.26 Fno = 2.23 TLA = 4.58 ω(°) = 38.9

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.24000 | | |
| 2* | 1.56056 | 0.58300 | 1.544 | 55.57 |
| 3* | 26.80109 | 0.02300 | | |
| 4* | 8.73695 | 0.24000 | 1.650 | 21.54 |

TABLE 2-continued

Numerical Data Example2
Unit mm
f = 3.98 ih = 3.26 Fno = 2.23 TLA = 4.58 ω(°) = 38.9

| | | | | |
|---|---|---|---|---|
| 5* | 2.70027 | 0.36300 | | |
| 6* | 34.57651 | 0.44100 | 1.535 | 55.66 |
| 7* | −200.00000 | 0.44200 | | |
| 8* | −8.77001 | 0.57900 | 1.535 | 55.66 |
| 9* | −1.14860 | 0.28100 | | |
| 10* | −2.53481 | 0.55500 | 1.535 | 55.66 |
| 11* | 1.75621 | 0.50000 | | |
| 12 | Infinity | 0.21000 | 1.517 | 64.20 |
| 13 | Infinity | 0.43179 | | |
| Image Plane | Infinity | | | |

Constituent Lens Data

| Lens | Start Surface | Focal Length |
|---|---|---|
| 1 | 2 | 3.02 |
| 2 | 4 | −6.10 |
| 3 | 6 | 55.16 |
| 4 | 8 | 2.41 |
| 5 | 10 | −1.86 |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | −5.068472E+00 | 0.000000E+00 | 0.000000E+00 |
| A4 | 7.240529E−03 | −1.563956E−01 | −1.597128E−01 | 2.636697E−03 | −1.339025E−01 | −1.028082E−01 |
| A6 | −6.336851E−02 | 6.364296E−01 | 7.156695E−01 | 2.015644E−01 | −1.440998E−02 | −7.327623E−02 |
| A8 | 1.308109E−01 | −1.073601E+00 | −1.076893E+00 | −1.236456E−01 | 7.493375E−02 | 9.485240E−02 |
| A10 | −1.169101E−01 | 5.223934E−01 | 4.062211E−01 | −1.053361E−01 | −6.358959E−02 | −8.553052E−02 |
| A12 | 0.000000E+00 | 0.000000E+00 | 1.252621E−01 | 1.565510E−01 | 6.984236E−02 | 5.216489E−02 |
| A14 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | 0.000000E+00 | −5.771409E+00 | 0.000000E+00 | −1.359327E+01 |
| A4 | 7.600140E−03 | −1.427150E−01 | −2.693519E−02 | −6.612270E−02 |
| A6 | 1.576240E−03 | 2.667844E−01 | 1.811724E−02 | 2.484268E−02 |
| A8 | −5.580430E−02 | −2.307502E−01 | 8.583729E−04 | −7.312510E−03 |
| A10 | 2.997161E−02 | 1.172813E−01 | −9.856002E−04 | 1.239458E−03 |
| A12 | −9.574490E−03 | −3.535014E−02 | 1.270532E−04 | −1.144278E−04 |
| A14 | 2.239293E−03 | 5.849207E−03 | −3.483129E−06 | 3.416440E−06 |
| A16 | −6.577247E−05 | −4.157181E−04 | −5.429639E−08 | 1.513706E−07 |

The Imaging lens in Example 2 is a convex surface facing the image-side surface of the third lens L3, and satisfies conditional expressions (1) to (9) as shown in Table 8.

Figure 4:
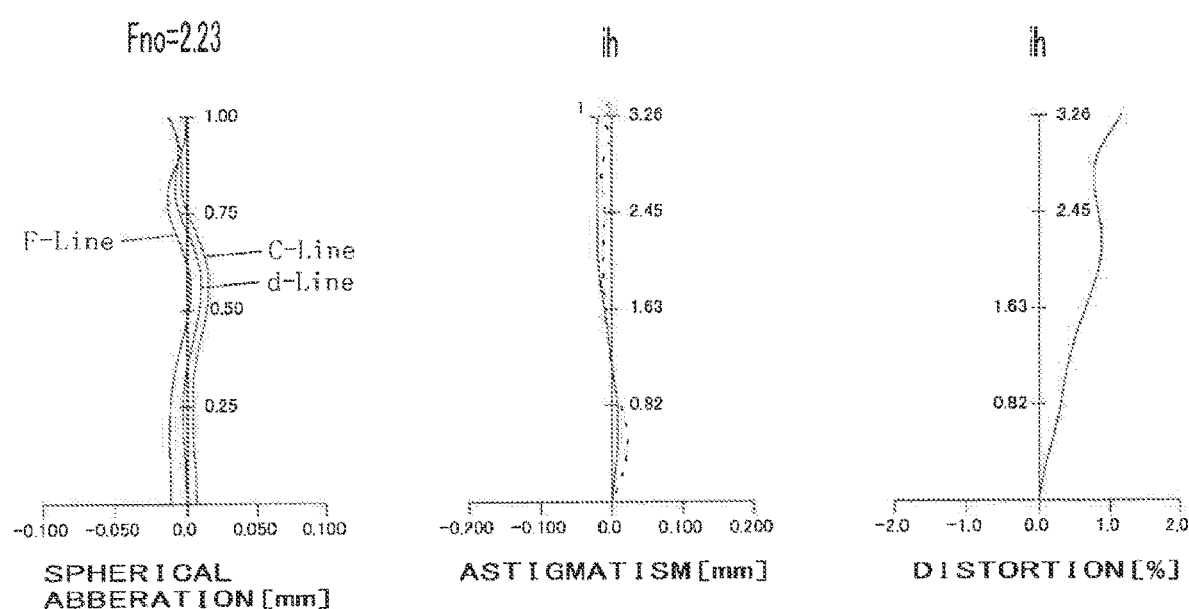
FIG. 4 shows spherical aberration, astigmatism, and distortion of the imaging lens in Example 2 according to the present invention.
Figure 5:
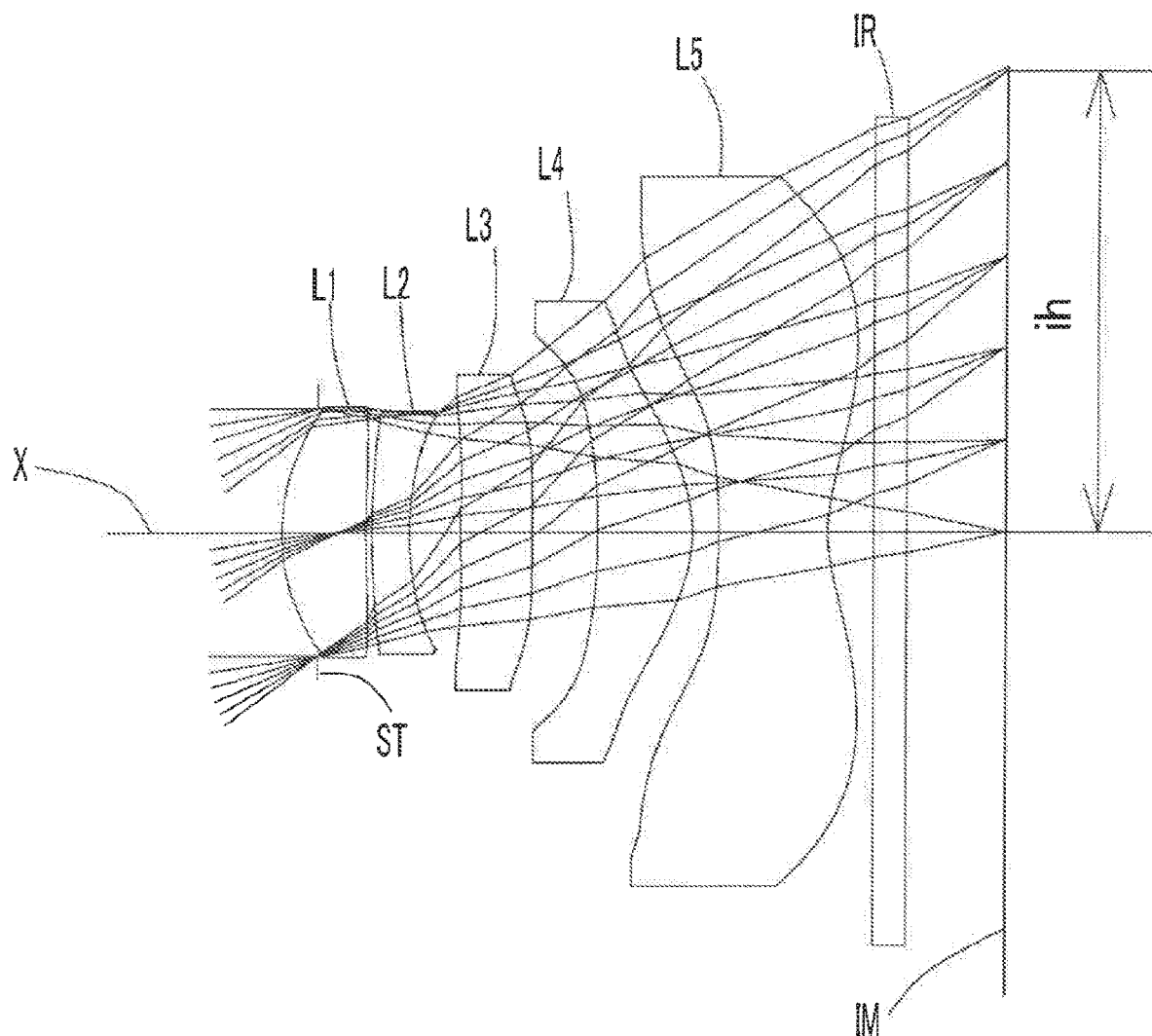
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected properly.

Total track length in air TLA is 4.58 mm, ratio of total track length to diagonal length is 0.70 as low-profile, and the imaging lens has brightness of F2.23 and wide field of view of about 78 degrees.

Example 3

The basic lens data is shown below in Table 3.

TABLE 3

Numerical Data Example3
Unit mm
f = 3.90 ih = 3.26 Fno = 2.25 TLA = 4.58 ω(°) = 39.4

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | infinity | −0.23500 | | |
| 2* | 1.52460 | 0.54400 | 1.544 | 55.86 |
| 3* | 5.48510 | 0.04000 | | |
| 4* | 3.43400 | 0.24000 | 1.650 | 21.54 |
| 5* | 2.13600 | 0.33400 | | |
| 6* | 10.76760 | 0.45700 | 1.535 | 55.66 |

TABLE 3-continued

Numerical Data Example3
Unit mm
f = 3.90 ih = 3.26 Fno = 2.25 TLA = 4.58 ω(°) = 39.4

| | | | | |
|---|---|---|---|---|
| 7* | −200.00000 | 0.42400 | | |
| 8* | −4.72400 | 0.59700 | 1.535 | 55.66 |
| 9* | −1.17030 | 0.16600 | | |
| 10* | −7.72750 | 0.70000 | 1.535 | 55.66 |
| 11* | 1.34570 | 0.50000 | | |
| 12 | Infinity | 0.21000 | 1.517 | 64.20 |
| 13 | Infinity | 0.43653 | | |
| Image Plane | infinity | | | |

Constituent Lens Data

| Lens | Start Surface | Focal Length |
|---|---|---|
| 1 | 2 | 3.70 |
| 2 | 4 | −9.37 |
| 3 | 6 | 19.12 |
| 4 | 8 | 2.75 |
| 5 | 10 | −2.09 |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 5.965788E−03 | −3.904468E−01 | −4.769130E−01 | −1.770315E−01 | −1.398482E−01 | −7.015717E−02 |
| A6 | −4.259745E−02 | 9.961244E−01 | 1.263878E+00 | 5.335076E−01 | 3.408424E−02 | −1.179972E−01 |
| A8 | 9.262561E−02 | −1.222717E+00 | −1.534201E+00 | −5.708824E−01 | −5.772230E−03 | 1.615642E−01 |
| A10 | −8.437085E−02 | 5.116779E−01 | 6.859739E−01 | 2.867518E−01 | −1.027615E−02 | −1.475939E−01 |
| A12 | 0.000000E+00 | 0.000000E+00 | 0.000000E+00 | 0.000000E+00 | 5.290532E−02 | 6.936953E−02 |
| A14 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | 0.000000E+00 | −5.975160E+00 | 0.000000E+00 | −7.953296E+00 |
| A4 | 8.929992E−02 | −1.517063E−01 | −1.358220E−01 | −8.954259E−02 |
| A6 | −2.252590E−01 | 2.440136E−01 | 2.173619E−02 | 3.894070E−02 |
| A8 | 3.181359E−01 | −2.965473E−01 | 2.875281E−02 | −1.317083E−02 |
| A10 | −3.788393E−01 | 2.409682E−01 | −1.360741E−02 | 2.993411E−03 |
| A12 | 2.790644E−01 | −1.072198E−01 | 2.274175E−03 | −4.431562E−04 |
| A14 | −1.105173E−01 | 2.374075E−02 | −1.284650E−04 | 3.755446E−05 |
| A16 | 1.786434E−02 | −2.066682E−03 | −1.148335E−06 | −1.339408E−06 |

The imaging lens in Example 3 is a convex surface facing the image-side surface of the third lens L3, and satisfies conditional expressions (1) to (9) as shown in Table 8.

Figure 6:
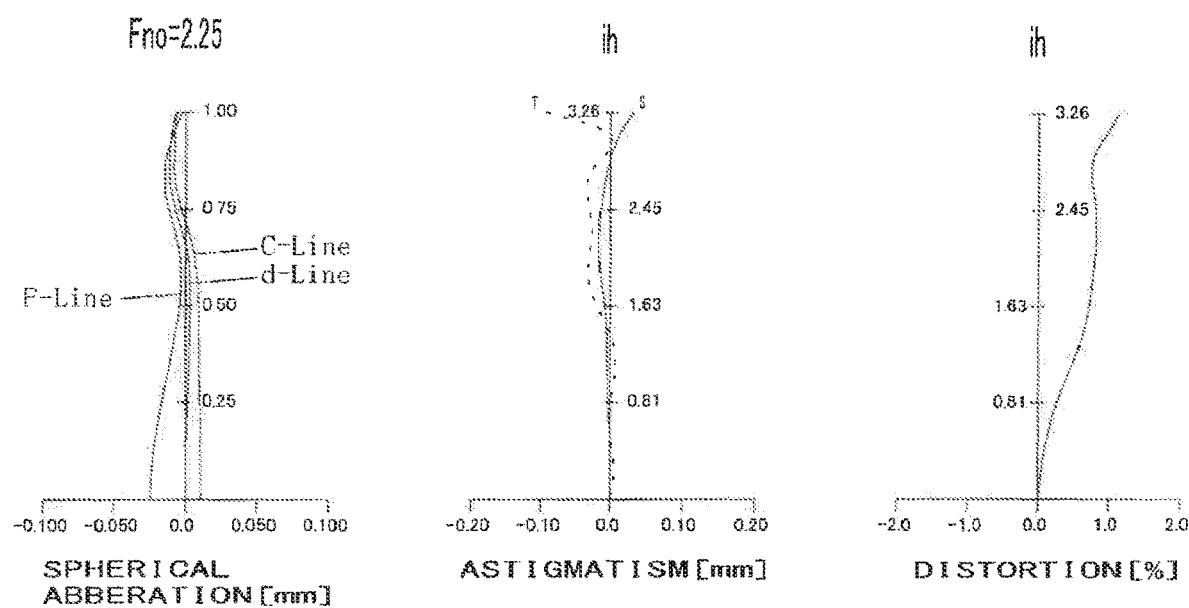
FIG. 6 shows spherical aberration, astigmatism, and distortion of the imaging lens in Example 3 according to the present invention.
Figure 7:
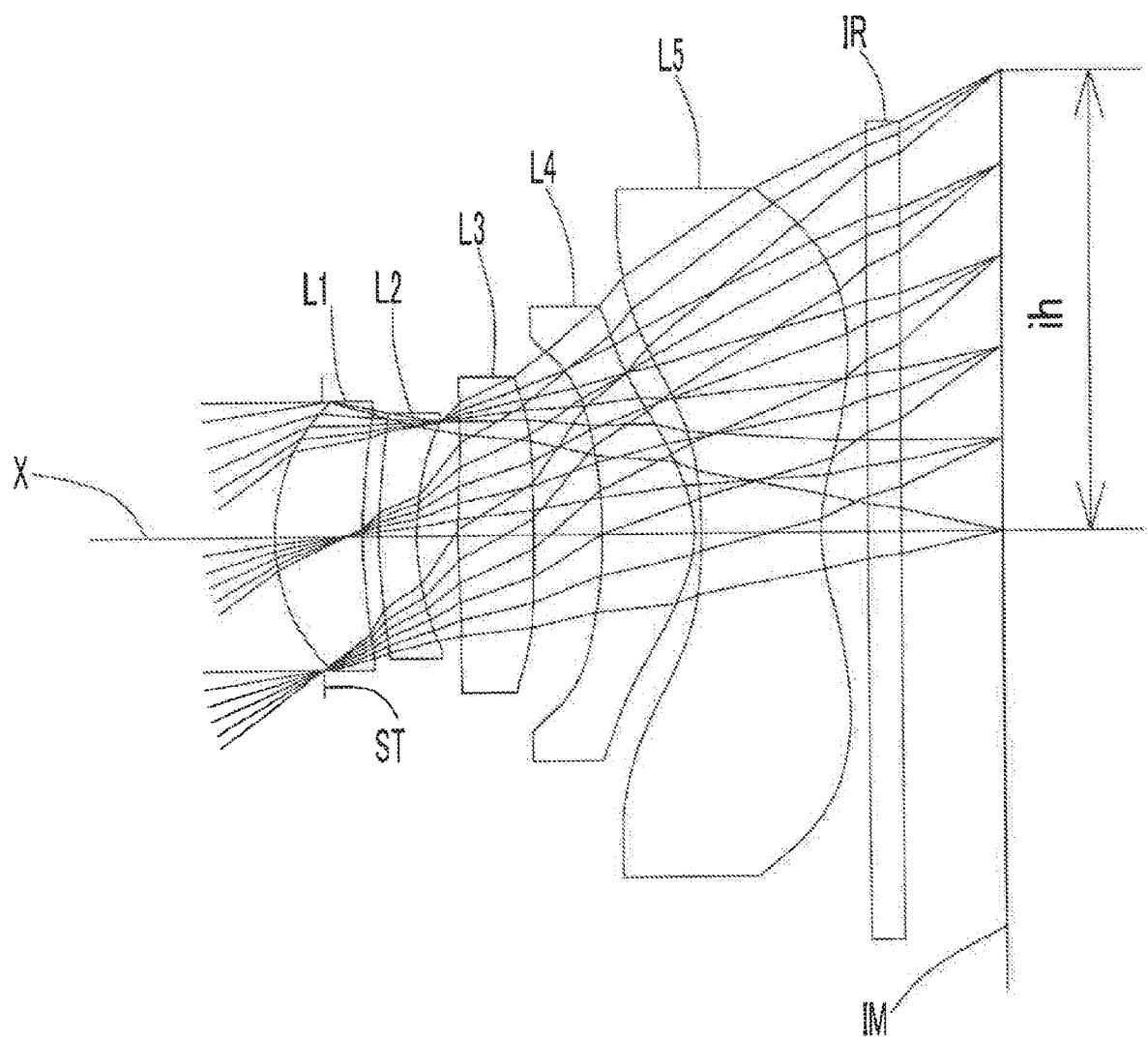
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected properly.

Total track length in air TLA is 4.58 mm, ratio of total track length to diagonal length is 0.70 as low-profile, and the imaging lens has brightness of F2.25 and wide field of view of about 79 degrees.

Example 4

The basic lens data is shown below in Table 4.

TABLE 4

Numerical Data Example4
Unit mm
f = 3.92 ih = 3.26 Fno = 2.08 TLA = 4.58 ω(°) = 39.3

Surface Data

| Surface Number i | Curvature Radius r | Surface Distance d | Refractive Index Nd | Abbe Number vd |
|---|---|---|---|---|
| (Object) | infinity | Infinity | | |
| 1 (Stop) | infinity | −0.30501 | | |
| 2* | 1.46800 | 0.55834 | 1.544 | 55.86 |
| 3* | 3.93602 | 0.10029 | | |
| 4* | 3.05060 | 0.24000 | 1.650 | 21.54 |
| 5* | 2.00000 | 0.26100 | | |
| 6* | 5.80615 | 0.48839 | 1.535 | 55.66 |
| 7* | −200.00000 | 0.45017 | | |
| 8* | −3.60020 | 0.59130 | 1.535 | 55.66 |

TABLE 4-continued

Numerical Data Example4
Unit mm
f = 3.92 ih = 3.26 Fno = 2.08 TLA = 4.58 ω(°) = 39.3

| | | | | |
|---|---|---|---|---|
| 9* | −0.97127 | 0.05000 | | |
| 10* | −3.96086 | 0.75500 | 1.535 | 55.66 |
| 11* | 1.30408 | 0.50000 | | |
| 12 | Infinity | 0.21000 | 1.517 | 64.20 |
| 13 | Infinity | 0.44436 | | |
| Image Plane | Infinity | | | |

Constituent Lens Data

| Lens | Start Surface | Focal Length |
|---|---|---|
| 1 | 2 | 3.98 |
| 2 | 4 | −9.81 |
| 3 | 6 | 10.56 |
| 4 | 8 | 2.31 |
| 5 | 10 | −1.75 |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 3.340983E−03 | −1.541695E−01 | −3.193269E−01 | −2.270911E−01 | −1.233168E−01 | −5.874683E−02 |
| A6 | −9.074487E−04 | 2.298893E−01 | 5.195820E−01 | 4.368899E−01 | 1.478043E−02 | −5.717421E−02 |
| A8 | 1.934225E−02 | −8.550991E−02 | −3.211624E−01 | −2.714883E−01 | 1.400470E−02 | 4.524631E−02 |
| A10 | −3.491802E−03 | −4.518595E−02 | 9.594125E−05 | 7.685172E−02 | 1.610789E−02 | −5.570491E−02 |
| A12 | 0.000000E+00 | 0.000000E+00 | 0.000000E+00 | 0.000000E+00 | 1.498791E−02 | 3.858503E−02 |
| A14 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | 0.000000E+00 | −2.399836E+00 | 0.000000E+00 | −9.293360E+00 |
| A4 | 5.186728E−02 | 9.629135E−02 | −9.538889E−02 | −8.925838E−02 |
| A6 | −1.079081E−01 | −1.906765E−01 | 1.149096E−02 | 4.363381E−02 |
| A8 | 1.419318E−01 | 2.144282E−01 | 2.921532E−02 | −1.725350E−02 |
| A10 | −1.812094E−01 | −1.097595E−01 | −1.343619E−02 | 4.387023E−03 |
| A12 | 1.355319E−01 | 2.694781E−01 | 2.272898E−02 | −6.917903E−04 |
| A14 | −5.953312E−02 | −2.843158E−03 | −1.297585E−04 | 5.944739E−05 |
| A16 | 1.157691E−02 | 6.311781E−05 | −1.446658E−06 | −2.060227E−06 |

The imaging lens in Example 4 is a convex surface facing the image-side surface of the third lens L3, and satisfies conditional expressions (1) to (9) as shown in Table 8.

Figure 8:
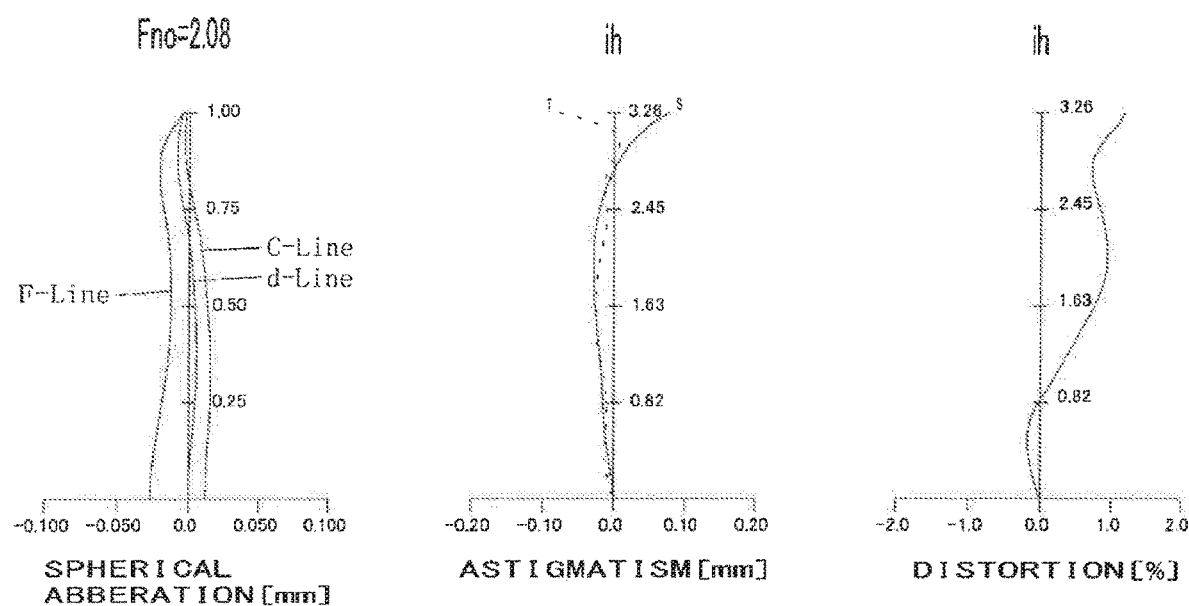
FIG. 8 shows spherical aberration, astigmatism, and distortion of the imaging lens in Example 4 according to the present invention.
Figure 9:
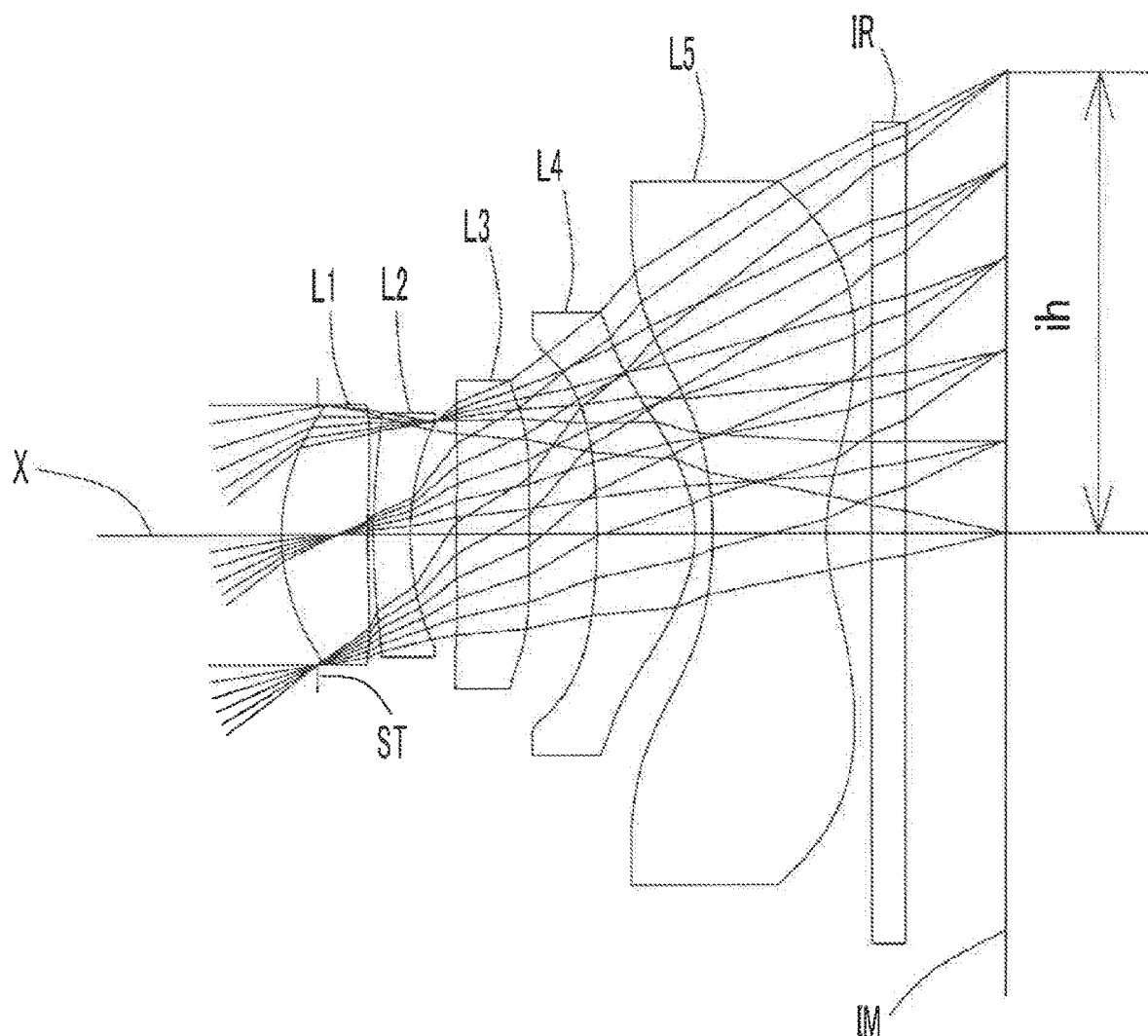
FIG. 9 is a schematic view showing the general configuration of an imaging lens in Example 5 according to the present invention.

FIG. 8 shows spherical aberration (mm), astigmatism (mm), and distortion (%) of the imaging lens in Example 4. As shown in FIG. 8, each aberration is corrected properly.

Total track length in air TLA is 4.58 mm, ratio of total track length to diagonal length is 0.70 as low-profile, and the imaging lens has brightness of F2.08 and wide field of view of about 79 degrees.

Example 5

The basic lens data Is shown below in Table 5.

TABLE 5

Numerical Data Example5
Unit mm
f = 3.83 ih = 3.26 Fno = 2.09 TLA = 4.58 ω(°) = 40.0

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.23250 | | |
| 2* | 1.58472 | 0.55993 | 1.544 | 55.86 |
| 3* | 7.18953 | 0.03498 | | |
| 4* | 3.38475 | 0.24000 | 1.650 | 21.54 |
| 5* | 1.97547 | 0.29382 | | |
| 6* | 8.00259 | 0.47043 | 1.535 | 55.66 |
| 7* | −200.00000 | 0.42900 | | |
| 8* | −5.04379 | 0.62500 | 1.535 | 55.66 |
| 9* | −1.01640 | 0.11240 | | |
| 10* | −3.64800 | 0.73000 | 1.535 | 55.66 |

TABLE 5-continued

Numerical Data Example5
Unit mm
f = 3.83 ih = 3.26 Fno = 2.09 TLA = 4.58 ω(°) = 40.0

| | | | | |
|---|---|---|---|---|
| 11* | 1.38464 | 0.50000 | | |
| 12 | Infinity | 0.21000 | 1.517 | 64.20 |
| 13 | Infinity | 0.44860 | | |
| Image Plane | Infinity | | | |

Constituent Lens Data

| Lens | Start Surface | Focal Length |
|---|---|---|
| 1 | 2 | 3.61 |
| 2 | 4 | −7.82 |
| 3 | 6 | 14.40 |
| 4 | 8 | 2.26 |
| 5 | 10 | −1.79 |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 1.462133E−02 | −3.520495E−01 | −4.558266E−01 | −1.917159E−01 | −1.416674E−01 | −7.419507E−02 |
| A6 | −8.100385E−02 | 9.956436E−01 | 1.285353E+00 | 5.232698E−01 | 9.210716E−02 | −9.551791E−02 |
| A8 | 1.527277E−01 | −1.227163E+00 | −1.569546E+00 | −5.328908E−01 | −1.419365E−01 | 1.570541E−01 |
| A10 | −1.114816E−01 | 4.819144E−01 | 6.480302E−01 | 2.230817E−01 | 1.704104E−01 | −1.806943E−01 |
| A12 | 0.000000E+00 | 0.000000E+00 | 0.000000E+00 | 0.000000E+00 | −2.772339E−02 | 9.386250E−02 |
| A14 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | 0.000000E+00 | −4.953710E+00 | 0.000000E+00 | −9.307535E+00 |
| A4 | 3.972596E−02 | −1.876714E−01 | −8.752030E−02 | −7.903379E−02 |
| A6 | −1.933768E−01 | 2.672734E−01 | 1.122953E−02 | 3.552642E−02 |
| A8 | 3.265343E−01 | −2.947786E−01 | 2.901561E−02 | −1.289630E−02 |
| A10 | −3.962153E−01 | 2.380602E−01 | −1.346353E−02 | 3.063509E−03 |
| A12 | 2.765839E−01 | −1.077455E−01 | 2.287431E−03 | −4.585780E−04 |
| A14 | −1.047059E−01 | 2.423403E−02 | −1.332263E−04 | 3.820240E−05 |
| A16 | 1.695510E−02 | −2.131588E−03 | −9.620300E−07 | −1.316394E−06 |

The imaging lens in Example 5 is a convex surface facing the image-side surface of the third lens L3, and satisfies conditional expressions (1) to (9) as shown in Table 8.

Figure 10:
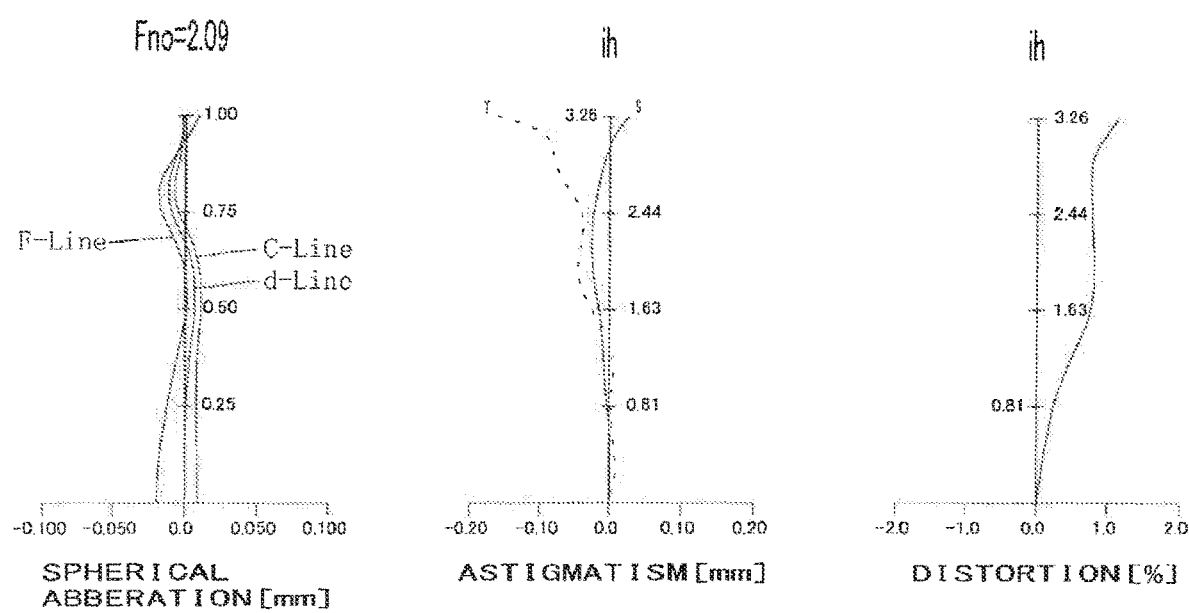
FIG. 10 shows spherical aberration, astigmatism, and distortion of the imaging lens in Example 5 according to the present invention.
Figure 11:
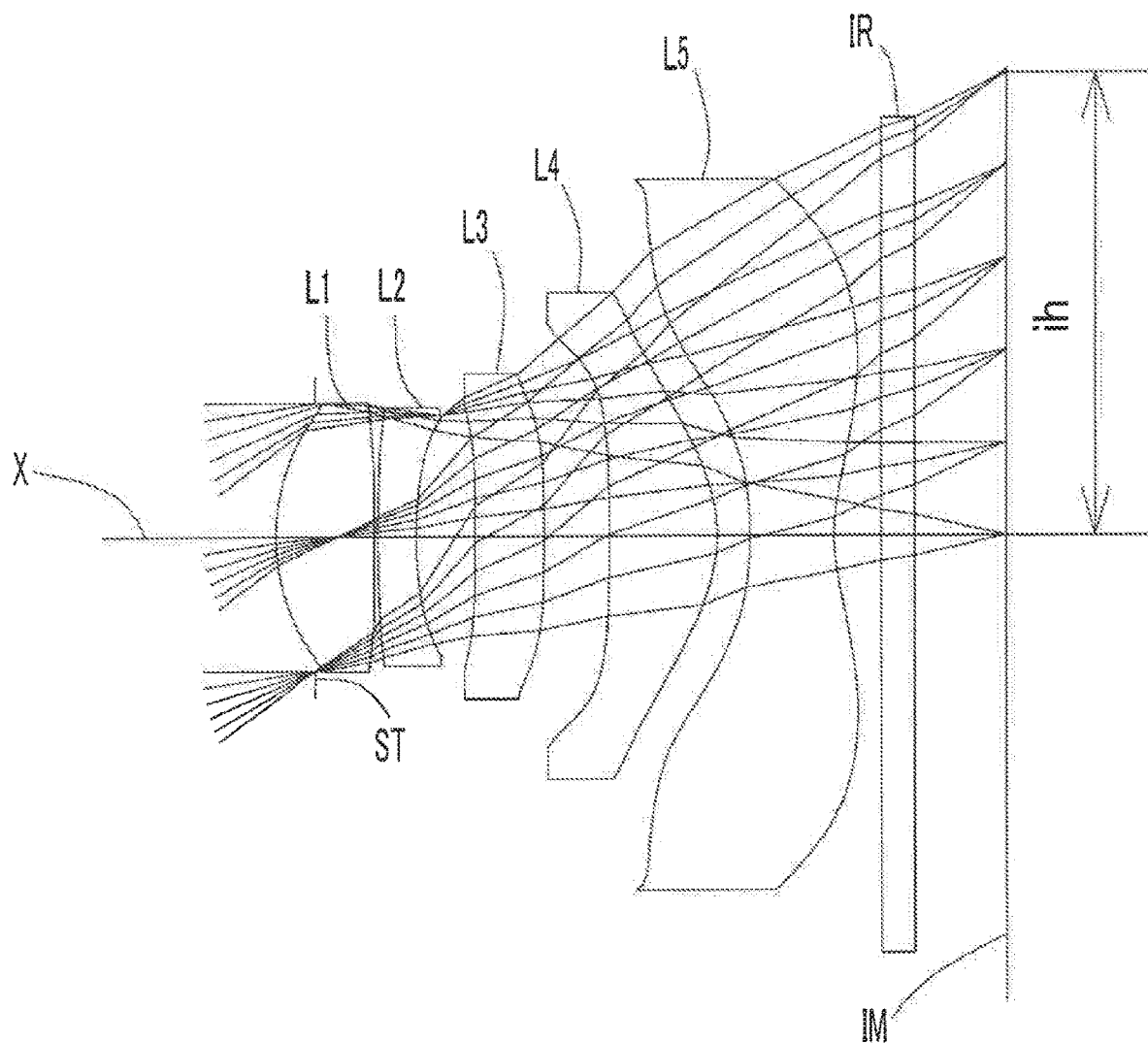
FIG. 11 is a schematic view showing the general configuration of an imaging lens in Example 6 according to the present invention.

FIG. 10 shows spherical aberration (mm), astigmatism (mm), and distortion (%) of the imaging lens in Example 5. As shown in FIG. 10, each aberration is corrected properly.

Total track length in air TLA is 4.58 mm, ratio of total track length to diagonal length is 0.70 as low-profile, and the imaging lens has brightness of F2.09 and wide field of view of about 80 degrees.

Example 6

The basic lens data is shown below in Table 6.

TABLE 6

Numerical Data Example6
Unit mm
f = 3.90 ih = 3.26 Fno = 2.08 TLA = 4.58 ω(°) = 39.5

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.25250 | | |
| 2* | 1.55094 | 0.61911 | 1.544 | 55.86 |
| 3* | 31.47724 | 0.02300 | | |
| 4* | 13.90587 | 0.24000 | 1.650 | 21.54 |
| 5* | 3.06875 | 0.37703 | | |
| 6* | 39.48103 | 0.44240 | 1.535 | 55.66 |
| 7* | −200.00000 | 0.42408 | | |
| 8* | −26.43857 | 0.69375 | 1.535 | 55.66 |
| 9* | −1.17965 | 0.20959 | | |
| 10* | −2.86274 | 0.52500 | 1.535 | 55.66 |
| 11* | 1.51311 | 0.50000 | | |

TABLE 6-continued

Numerical Data Example6
Unit mm
f = 3.90 ih = 3.26 Fno = 2.08 TLA = 4.58 ω(°) = 39.5

| | | | | |
|---|---|---|---|---|
| 12 | Infinity | 0.21000 | 1.517 | 64.20 |
| 13 | Infinity | 0.38630 | | |
| Image Plane | Infinity | Infinity | | |

Constituent Lens Data

| Lens | Start Surface | Focal Length |
|---|---|---|
| 1 | 2 | 2.98 |
| 2 | 4 | −6.11 |
| 3 | 6 | 61.69 |
| 4 | 8 | 2.29 |
| 5 | 10 | −1.78 |

Aspheric Surface Data

| | Second Surface | Third Surface | Fourth Surface | Fifth Surface | Sixth Surface | Seventh Surface |
|---|---|---|---|---|---|---|
| k | −4.551814E−03 | 0.000000E+00 | 0.000000E+00 | −2.977431E+00 | 0.000000E+00 | 0.000000E+00 |
| A4 | 1.163852E−02 | −1.690376E−01 | −1.536986E−01 | 2.133798E−02 | −1.385817E−01 | −1.088849E−01 |
| A6 | −7.205089E−02 | 5.894191E−02 | 6.706061E−01 | 1.259507E−01 | 2.076564E−02 | −5.781347E−02 |
| A8 | 1.221111E−01 | −8.260600E−01 | −8.672882E−01 | 4.304131E−02 | 2.921734E−02 | 1.045777E−01 |
| A10 | −9.373660E−02 | 3.463443E−01 | 3.311791E−01 | −2.196317E−01 | −1.111677E−01 | −1.204996E−01 |
| A12 | 0.000000E+00 | 0.000000E+00 | 4.549225E−02 | 1.741218E−01 | 1.166781E−01 | 6.144469E−02 |
| A14 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | 0.000000E+00 | −4.702861E+00 | 0.000000E+00 | −1.143394E+01 |
| A4 | 5.419926E−03 | −5.816745E−02 | −1.203187E−01 | −8.693692E−02 |
| A6 | −1.094900E−01 | 3.407963E−03 | 5.697847E−02 | 4.321121E−02 |
| A8 | 1.379961E−01 | 4.975721E−02 | 7.028175E−04 | −1.657845E−02 |
| A10 | −1.310420E−01 | −4.380366E−02 | −3.938325E−03 | 4.169528E−03 |
| A12 | 6.618553E−02 | 1.891058E−02 | 7.243201E−04 | −6.674981E−04 |
| A14 | −1.812554E−02 | −4.245194E−03 | −3.817594E−05 | 6.031307E−05 |
| A16 | 2.406290E−03 | 3.810160E−04 | −4.018426E−07 | −2.281015E−06 |

The imaging lens in Example 6 is a convex surface facing the image-side surface of the third lens L3, and satisfies conditional expressions (1) to (9) as shown in Table 8.

Figure 12:
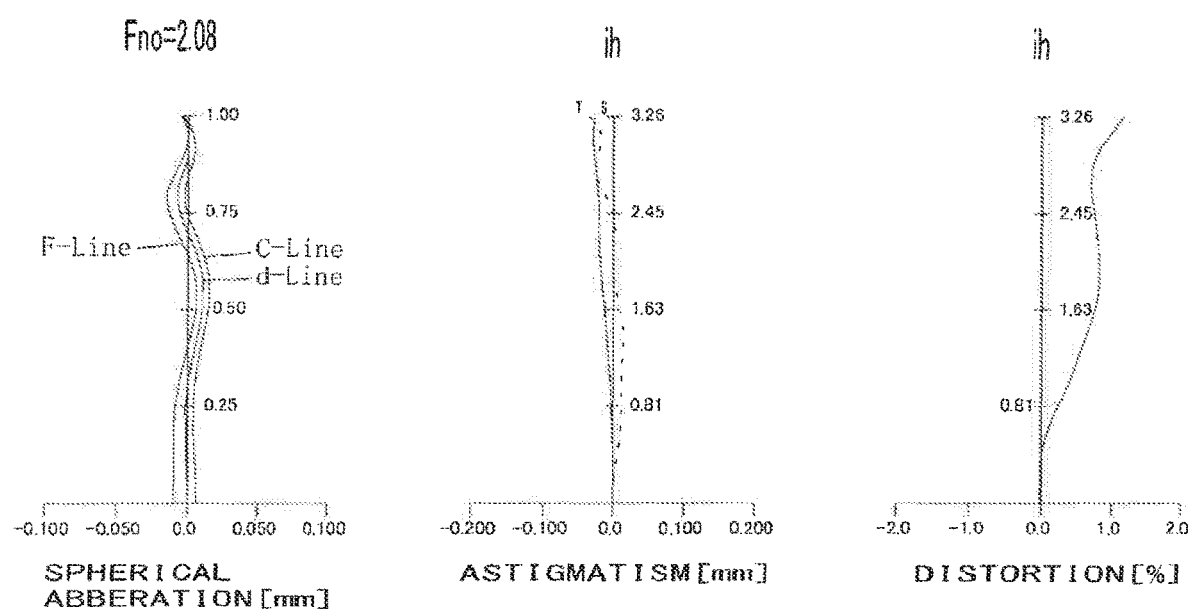
FIG. 12 shows spherical aberration, astigmatism, and distortion of the imaging lens in Example 6 according to the present invention.
Figure 13:
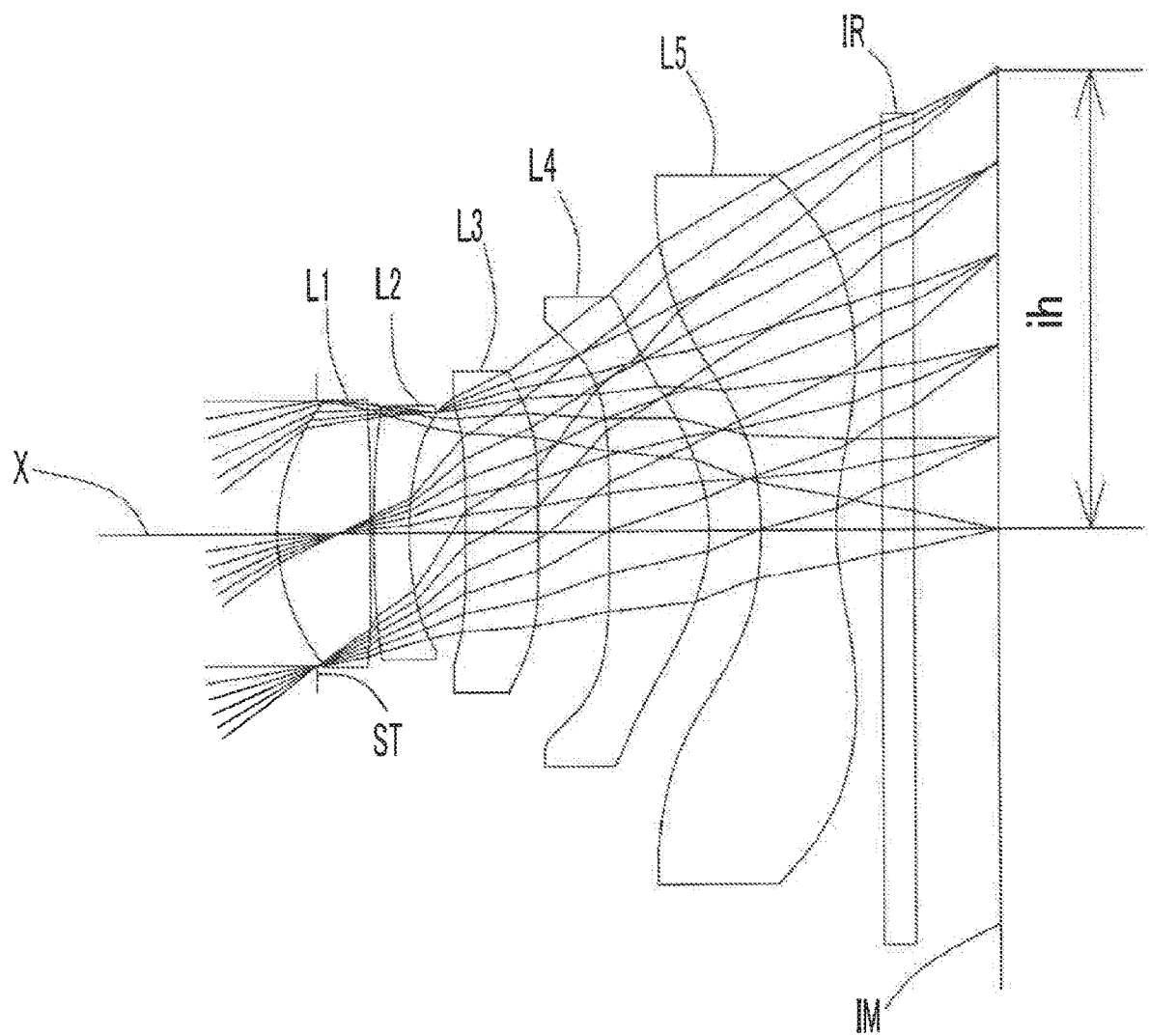
FIG. 13 is a schematic view showing the general configuration of an imaging lens in Example 7 according to the present invention.

FIG. 12 shows spherical aberration (mm), astigmatism (mm), and distortion (%) of the imaging lens in Example 6. As shown in FIG. 12, each aberration is corrected properly.

Total track length in air TLA is 4.58 mm, ratio of total track length to diagonal length is 0.70 as low-profile, and the imaging lens has brightness of F2.08 and wide field of view of about 79 degrees.

Example 7

The basic lens data is shown below in Table 7.

TABLE 7

Numerical Data Example7
Unit mm
f = 3.90 ih = 3.26 Fno = 2.08 TLA = 4.58 ω(°) = 39.4

Surface Date

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.26250 | | |
| 2* | 1.56011 | 0.60767 | 1.544 | 55.86 |
| 3* | 23.00000 | 0.02300 | | |
| 4* | 8.66769 | 0.23100 | 1.650 | 21.54 |
| 5* | 2.65209 | 0.36318 | | |
| 6* | 28.68485 | 0.46491 | 1.535 | 55.66 |
| 7* | −200.00000 | 0.45545 | | |
| 8* | −25.61059 | 0.63763 | 1.535 | 55.66 |
| 9* | −1.33366 | 0.33421 | | |
| 10* | −2.87100 | 0.48700 | 1.535 | 55.66 |
| 11* | 1.82690 | 0.50000 | | |

TABLE 7-continued

Numerical Data Example7
Unit mm
f = 3.90 ih = 3.26 Fno = 2.08 TLA = 4.58 ω(°) = 39.4

| | | | | |
|---|---|---|---|---|
| 12 | Infinity | 0.21000 | 1.517 | 64.20 |
| 13 | Infinity | 0.33527 | | |
| Image Plane | Infinity | | | |

Constituent Lens Data

| Lens | Start Surface | Focal Length |
|---|---|---|
| 1 | 2 | 3.04 |
| 2 | 4 | −5.97 |
| 3 | 6 | 46.94 |
| 4 | 8 | 2.61 |
| 5 | 10 | −2.01 |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 1.240003E−02 | −1.966224E−01 | −2.029026E−01 | −3.010548E−02 | −1.418695E−01 | −1.128456E−01 |
| A6 | −6.741343E−02 | 6.943538E−01 | 7.947761E−01 | 2.030602E−01 | −3.543066E−03 | −4.604748E−02 |
| A8 | 1.144991E−01 | −9.039921E−01 | −9.609671E−01 | −8.507994E−02 | 9.911403E−02 | 8.652979E−02 |
| A10 | −8.427047E−02 | 3.539739E−01 | 3.586809E−01 | −5.984523E−02 | −2.228508E−01 | −1.135003E−01 |
| A12 | 0.000000E+00 | 0.000000E+00 | 2.269166E−02 | 7.971970E−02 | 1.788701E−01 | 5.826743E−02 |
| A14 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | 0.000000E+00 | −7.402589E+00 | 0.000000E+00 | −1.353587E+01 |
| A4 | −1.786706E−02 | −1.880924E−01 | −1.113766E−01 | −7.103740E−02 |
| A6 | −6.741885E−02 | 2.488454E−01 | 5.245606E−02 | 2.397357E−02 |
| A8 | 1.122724E−01 | −2.333981E−01 | 1.131143E−03 | −4.915606E−03 |
| A10 | −1.467424E−01 | 1.481235E−01 | −3.907493E−03 | 3.508867E−04 |
| A12 | 9.823444E−02 | −5.422236E−02 | 7.177689E−04 | 2.894085E−05 |
| A14 | −3.370920E−02 | 1.020253E−02 | −3.534959E−05 | −5.958222E−06 |
| A16 | 4.827133E−03 | −7.684818E−04 | −8.121016E−07 | 2.718917E−07 |

The imaging lens in Example 7 is a convex surface facing the image-side surface of the third lens L3, and satisfies conditional expressions (1) to (9) as shown in Table 8.

Figure 14:
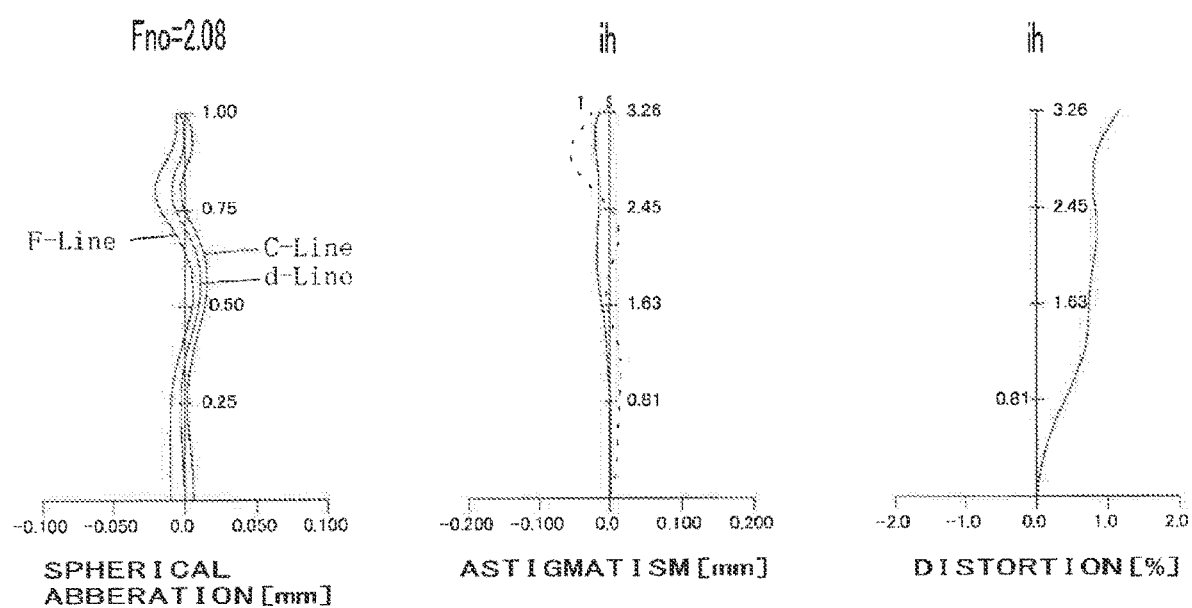
FIG. 14 shows spherical aberration, astigmatism, and distortion of the imaging lens in Example 7 according to the present invention.

FIG. 14 shows spherical aberration (mm), astigmatism (mm), and distortion (%) of the imaging lens in Example 7. As shown in FIG. 14, each aberration is corrected properly.

Total track length in air TLA is 4.58 mm, ratio of total track length to diagonal length is 0.70 as low-profile, and the imaging lens has brightness of F2.08 and wide field of view of about 79 degrees.

As explained above, according to the imaging lens related to the present embodiments, there is provided the low-profiled imaging lens having the total track length in air TLA smaller than 5 mm, and ratio of total track length to diagonal length smaller than 0.9. There is realized a compact imaging lens having brightness of F2.4 or less, capable of photographing having field of view of 70 degrees or more, and having high resolution which aberrations are properly corrected.

In table 8, values of conditional expressions (1) to (9) related to the Examples 1 to 7 are shown.

TABLE 8

| Conditional Expression | Example1 | Example2 | Example3 | Example4 | Example5 | Example6 | Example7 |
|---|---|---|---|---|---|---|---|
| (1) \|r6/f\| | 49.30 | 50.29 | 51.28 | 50.99 | 52.24 | 51.28 | 51.22 |
| (2) (T1/f) × 100 | 1.03 | 0.58 | 1.03 | 2.56 | 0.91 | 0.59 | 0.59 |
| (3) f1/\|f2\| | 0.50 | 0.50 | 0.39 | 0.41 | 0.46 | 0.49 | 0.51 |
| (4) f45/f | −9.11 | −9.25 | −6.18 | −3.56 | −8.20 | −9.76 | −14.42 |
| (5) D4/D5 | 0.88 | 1.04 | 0.85 | 0.78 | 0.86 | 1.32 | 1.31 |
| (6) r9/r10 | −1.62 | −1.44 | −5.74 | −3.04 | −2.63 | −1.89 | −1.57 |
| (7) TLA/2ih | 0.70 | 0.70 | 0.70 | 0.70 | 0.70 | 0.70 | 0.70 |
| (8) ih/f | 0.82 | 0.82 | 0.84 | 0.83 | 0.85 | 0.84 | 0.83 |
| (9) r6/r7 | — | 22.81 | 42.34 | 55.55 | 39.65 | 7.56 | 7.81 |

When the imaging lens having five lenses related to the present invention is applied to an increasingly compact and low-profile portable terminal device such as a mobile phone and a smartphone, an information terminal such as a game console and a PC, and a camera built in a home appliance or the like, it is possible to contribute to low-profileness, low F-value and wide field of view, as well as high-performance of the camera.

According to the present invention, there is obtained a compact imaging lens with high-resolution which realizes the low-profileness, low F-value and the wide field of view in well balance, and properly corrects various aberrations.

What is claimed is:

1. An imaging lens forming an image of an object on a solid-state image sensor, comprising in order from an object side to an image side, a first lens having a convex surface facing the object side and a concave surface facing the image side, a second lens having a meniscus shape and a concave surface facing the image side, a third lens having positive refractive power and a convex surface facing the object side near an optical axis, a fourth lens having a meniscus shape and a convex surface facing the image side, and a fifth lens having negative refractive power and a concave surface facing the image side and the image side near the optical axis, wherein below conditional expressions (3b), (4), (5b), and (9a) are satisfied:

$$0.39 \leq f1/|f2| \leq 0.51 \quad (3b)$$

$$-27 < f45/f < -3 \quad (4)$$

$$0.78 \leq D4/D5 \leq 1.32 \quad (5b)$$

$$6.8 < r6/r7 < 60 \quad (9a)$$

where f: the focal length of the overall optical system of the imaging lens,
f1: focal length of the first lens,
f2: focal length of the second lens,
f45: the composite focal length of the fourth lens and the fifth lens,
D4: thickness on the optical axis of the fourth lens,
D5: thickness on the optical axis of the fifth lens,
r6: curvature radius of the image-side surface of the third lens, and
r7: curvature radius of the object-side surface of the fourth lens.

2. The imaging lens according to claim 1, wherein a conditional expression (2) below is satisfied:

$$0.5 < (T1/f)*100 < 3.1 \quad (2)$$

where f: the focal length of the overall optical system of the imaging lens, and
T1: distance along the optical axis from the image-side surface of the first lens to the object-side surface of the second lens.

3. The imaging lens according to claim 1, wherein a conditional expression (6) below is satisfied:

$$-6.9 < r9/r10 < -1.2 \quad (6)$$

where r9: curvature radius of the object-side surface of the fifth lens, and
r10: curvature radius of the image-side surface of the fifth lens.

4. The imaging lens according to claim 1, wherein a conditional expression (7) below is satisfied:

$$TLA/2ih < 0.9 \quad (7)$$

where

TLA: total track length in air, and
ih: maximum image height.

5. The imaging lens according to claim 1, wherein a conditional expression (8) below is satisfied:

$$0.7 < ih/f < 1.0 \quad (8)$$

where f: the focal length of the overall optical system of the imaging lens, and
ih: maximum image height.

6. The imaging lens according to claim 1, wherein said third lens has a convex surface facing an image side.

* * * * *